3,043,884
TETRAFLUORO-BENZOQUINONE-1,4 AND A
PROCESS FOR ITS MANUFACTURE
Kurt August Wilhelm Wallenfels and Wilfried Johannes Draber, Freiburg im Breisgau, Germany, assignors to Farbwerke Hoechst Aktiengesellschaft vormals Meister Lucius & Brüning, Frankfurt am Main, Germany, a corporation of Germany
Filed Feb. 13, 1958, Ser. No. 715,131
Claims priority, application Germany Aug. 17, 1957
1 Claim. (Cl. 260—623)

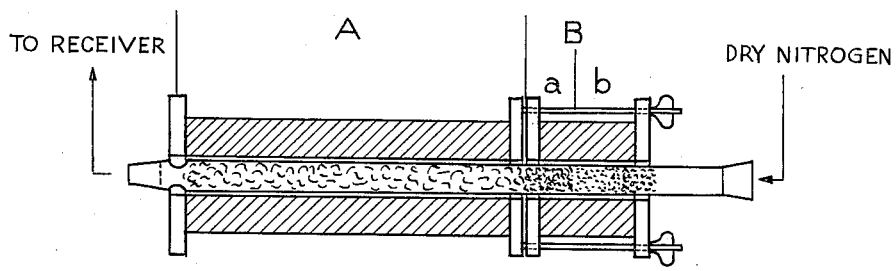

The present invention relates to tetrafluoro-benzoquinone-1,4 and to a process for its manufacture.

It is known to prepare aromatic compounds which are fluorinated in the nucleus by reacting aromatic compounds chlorinated in the nucleus and carrying, in addition to chlorine, at least two proton-loosening substituents, in the absence of solvents and at higher temperatures, with potassium fluoride. It has already been described, inter alia, to react according to said process chloranil with potassium fluoride.

Now we have found that the novel tetrafluoro-benzoquinone-1,4 can be produced in pure form by reacting chloranil at higher temperatures, that is to say generally in the range from 175 to 350° C., with potassium fluoride, reducing the reaction product formed to obtain the corresponding hydroquinone, subjecting said hydroquinone to a distillation with toluene vapor and then converting the tetrafluoro-hydroquinone (flowing point 167° C.) contained in the distillate in known manner with oxidizing agents, for example lead tetra-acetate, into tetrafluoro-quinone.

It has furthermore been found that the tetrafluoro-benzoquinone-1,4 mentioned can be prepared more simply and in a good yield when the reaction is carried out in a manner such that vaporous chloranil is conducted over potassium fluoride heated in general at 175 to 350° C., preferably, however, at 200 to 330° C., and the reaction product obtained is isolated. The reaction product may subsequently be purified by sublimation, for example under reduced pressure. When carrying out the reaction, care must be taken that the reactants are well dried. Since it is unavoidable that potassium fluoride absorbs water while being pulverized and filled into the reaction tube and since even traces of water reduce the yield, it is advisable to dry the potassium fluoride prior to the proper reaction by passing through an inert gas, such as nitrogen. The process according to the invention may be performed in a device as shown in the accompanying drawing wherein yields of 25 to 40% and more can be obtained. Parts A and B of the device are separately heated by means of built-in resistances. The temperature is regulated, for example, by a contact thermometer.

The tetrafluoro-benzoquinone-1,4 produced according to the process of the present invention is suitable as fungicidal compound. It is furthermore possible to utilize the chain-transferring action of said compound in the polymerization of olefins and vinyl compounds, for example vinyl chloride or vinyl acetate.

The tetrafluoro-benzoquinone-1,4 is furthermore distinguished by a marked reactivity and it is able, for example, to oxidize 1-dimethylamino-4-aminobenzene to obtain the dyestuff known as "Wurster's red."

The following example serves to illustrate the invention but it is not intended to limit it thereto.

*Example*

200 grams of potassium fluoride are dried in a drying chamber at 110° C., then ground in a ball mill and filled into a reaction tube. The reaction tube is then heated for three hours at about 350° C., while passing through dry nitrogen. The water vapor expelled from the potassium fluoride is conducted together with the nitrogen current into a receiver where it is absorbed by phosphoric anhydride. A mixture of 20 grams of chloranil and 20 grams of dried commercial calcium fluoride (part B/a) and there before 40 grams of calcium fluoride (part B/b) are then filled into the reaction tube before the potassium fluoride (part A). The furnace is then heated to 320° C. while nitrogen is allowed to pass through at a rate of 1 liter per hour. After some time the first sublimate separates in the receiver. 3.7 grams corresponding to a theoretical yield of 25% of purified tetrafluoro-benzoquinone-1,4 are obtained by sublimation at 50° C. under a pressure of 15 mm. of mercury. The product thus obtained has a flowing point of 177.5–179° C. and contains 41.7% of fluorine as compared with a theoretical value of 42.2%.

Recrystallized from a solution of benzene and petroleum ether the compound mentioned forms light yellow leaflets which are readily soluble in benzene, toluene, alcohol, ether or chloroform and moderately soluble in carbon tetrachloride, petroleum ether or 1-dichlorofluoro-2-dichlorofluoro-ethane. The compound is very readily volatile and has a redox potential of $E_0=+710$ mv. at 25° C. The compound is easily liable to solvolysis, especially with weakly basic reagents, furthermore with water or glacial acetic acid. The reduction of tetrafluoro-benzoquinone-1,4 to obtain tetrafluoro-hydroquinon-1.4 may be brought about catalytically with platinum dioxide in benzene. The tetrafluoro-hydroquinone-1.4 thus obtained forms colorless needles or leaflets and has a melting point of 162–163° C. In the solid state it is stable in the air, readily soluble in alcohol, water and ether and readily volatile. The fluorine atoms of the tetrafluoro-hydroquinone-1.4 are resistant to solvolysis.

We claim:
Tetrafluoro-hydroquinone-1.4.

References Cited in the file of this patent

FOREIGN PATENTS

| 755,668 | Great Britain | Aug. 22, 1956 |
| 924,512 | Germany | Mar. 3, 1955 |

OTHER REFERENCES

Price: Journ. of the Am. Chem. Soc., vol. 58, page 1836 (1936).
Tehon: Science, vol. 114, pages 663–664 (1951).
Chemical Abstracts, vol. 50, columns 9312-3 (1956). [Abstract of Finger et al., Illinois Geol. Survey Circ., vol. 199, 15 pages (1955)].
Wallenfels et al.: Chemische Berichte, vol. 90, pages 2819 to 2832 (1957).